United States Patent
Hanslmeier et al.

(10) Patent No.: US 11,402,014 B2
(45) Date of Patent: Aug. 2, 2022

(54) ELECTROMECHANICAL GEAR SELECTION DEVICE COMPRISING A STEPPING MOTOR

(71) Applicant: Hilti Aktiengesellschaft, Schaan (LI)

(72) Inventors: Xaver Hanslmeier, Mauerstetten (DE); John Van Taack-Trakranen, Munich (DE)

(73) Assignee: Hilti Aktiengesellschaft, Schaan (LI)

( * ) Notice: Subject to any disclaimer, the term of this patent is extended or adjusted under 35 U.S.C. 154(b) by 391 days.

(21) Appl. No.: 16/627,210

(22) PCT Filed: Jun. 22, 2018

(86) PCT No.: PCT/EP2018/066765
§ 371 (c)(1),
(2) Date: Dec. 27, 2019

(87) PCT Pub. No.: WO2019/002128
PCT Pub. Date: Jan. 3, 2019

(65) Prior Publication Data
US 2020/0116253 A1    Apr. 16, 2020

(30) Foreign Application Priority Data
Jun. 29, 2017 (EP) .................... 17178577

(51) Int. Cl.
*F16H 49/00* (2006.01)
*F16H 61/02* (2006.01)
(Continued)

(52) U.S. Cl.
CPC ......... *F16H 61/0213* (2013.01); *B25F 5/001* (2013.01); *F16H 61/2807* (2013.01); *F16H 61/682* (2013.01)

(58) Field of Classification Search
CPC .................. F16H 49/001; F16H 2049/003
(Continued)

(56) References Cited

U.S. PATENT DOCUMENTS 3,415,143 A * 12/1968 Ishikawa ............... F16H 49/001
74/640
8,307,738 B2 * 11/2012 Schmidt .................. F16H 25/06
74/640

(Continued)

FOREIGN PATENT DOCUMENTS

| EP | 2762278 | 8/2014 |
|---|---|---|
| EP | 3135438 | 3/2017 |

OTHER PUBLICATIONS

International Search Report of PCT/EP2018/066765, dated Sep. 27, 2018.

*Primary Examiner* — Ha Dinh Ho
(74) *Attorney, Agent, or Firm* — Davidson, Davidson & Kappel, LLC

(57) ABSTRACT

A method for selecting a gear in the transmission of a power tool having an electric motor. The method includes the following steps of changing an operating device from a first position to a second position in order to select a gear in the transmission; detecting a signal via at least one sensor corresponding to the second position of the operating device; sending the signal to a controller; changing the rotational speed of the electric motor from a first value to a second value via the controller; changing the operating device from the second position to a third position; changing the stepping motor from a first position to a second position corresponding to the third position of the operating device; and changing a shift fork from a first position to a second position in order to change from a first gear to a second gear.

8 Claims, 9 Drawing Sheets

(51) Int. Cl.
*B25F 5/00* (2006.01)
*F16H 61/28* (2006.01)
*F16H 61/682* (2006.01)

(58) Field of Classification Search
USPC .......................................................... 74/640
See application file for complete search history.

(56) References Cited

U.S. PATENT DOCUMENTS

| | | | |
|---|---|---|---|
| 8,881,615 B2 * | 11/2014 | Schreiber | F16H 19/04 74/424.94 |
| 10,683,922 B2 * | 6/2020 | Schreiber | F16H 49/001 |
| 11,098,796 B2 * | 8/2021 | Ottersbach | F01L 1/352 |
| 2009/0205451 A1 * | 8/2009 | Bayer | F16H 25/06 74/439 |
| 2010/0077882 A1 * | 4/2010 | Schreiber | F16H 25/06 74/462 |
| 2013/0292147 A1 | 11/2013 | Mergener | |

* cited by examiner

ELECTROMECHANICAL GEAR SELECTION DEVICE COMPRISING A STEPPING MOTOR

The present invention relates to a method for selecting a gear in the transmission of a power tool, particularly a core drilling machine, whereby the power tool has an electric motor for generating and transmitting a torque to the transmission as well as a controller for setting the rotational speed of the electric motor, and the transmission has an operating device for selecting a gear in the transmission, a shift fork for engaging a gear in the transmission as well as a stepping motor for transmitting a movement of the operating device to the shift fork, whereby the operating device has at least one signal transmitter as well as at least one sensor for receiving at least one signal from the at least one signal transmitter.

The invention also relates to a power tool for carrying out the method according to the invention. Moreover, the invention relates to a transmission for a power tool, especially a core drilling machine, for carrying out the method according to the invention.

BACKGROUND

A precise coordination of the rotational speed of the power tool with the tool bit being employed is particularly important when it comes to power tools, especially power tools with a rotating tool bit.

In this context, especially the size, the volume and the weight of the tool bit being employed constitute important factors. If the tool bit is too large and the rotational speed is too low, the progress of the work is too slow and inefficient, thereby slowing down the work process altogether. In contrast, if the rotational speed is too high, the power tool or the tool bit can become damaged.

When it comes to core drilling machines, a precise coordination or adaptation of the rotational speed of the tool bit, that is to say, of the core bit, to the size of the core bit or to the diameter of the core bit is of great importance.

Core drilling machines make use of cylindrical core bits that can cut into mineral materials, for example, concrete or masonry, using a diamond-tipped cutting edge. In order for the rotational speed and the torque of the core bit to be varied for various applications, core drilling machines normally also have a transmission comprising at least two gears. Thanks to the different gears, the rotational speed as well as the torque of the core bit can be set. Maintaining the most constant possible circumferential speed of the core bit during the core drilling procedure is very important for a proper and efficient core drilling process and especially in order to ensure that the core bit and the core drilling machine are used in a manner that is gentle on the material. For this purpose, however, it is often necessary to undertake a relatively fine coordination of the device to the diameter of the core bit that is being used. The correct coordination of the rotational speed, the torque and the correct gear to the diameter of the core bit being used often poses major problems for the user of the core drilling machine if the consistency (e.g. the degree of hardness) of the material to be worked is constantly changing. This can render the core drilling procedure either inefficient and slow or else it can cause damage to the core bit.

When it comes to the commercially available core drilling machines or the core drilling machines according to the state of the art, however, such a fine coordination between the size (diameter), the rotational speed, the torque of the core bit or the gear selected for the core drilling machine is either not an option at all or else it is very complicated for the user of the core drilling machine.

SUMMARY OF THE INVENTION

Before this backdrop, one objective of the present invention is to solve the above-mentioned problem.

The present invention provides a method for selecting a gear in the transmission of a power tool, particularly a core drilling machine, whereby the power tool has an electric motor for generating and transmitting a torque to the transmission as well as a controller for setting the rotational speed of the electric motor, and the transmission has an operating device for selecting a gear in the transmission, a shift fork for engaging a gear in the transmission as well as a stepping motor for transmitting a movement of the operating device to the shift fork, whereby the operating device has at least one signal transmitter as well as at least one sensor for receiving at least one signal from the at least one signal transmitter.

The present invention also provides a power tool for carrying out the method according to the invention as well as a transmission for a power tool, especially a core drilling machine, for carrying out the method according to the invention.

According to the invention, it is provided that the method comprises the following steps:
  changing the operating device from a first position to a second position in order to select a gear in the transmission;
  detecting a signal by means of at least one sensor corresponding to the second position of the operating device;
  sending the signal to the controller;
  changing the rotational speed of the electric motor from a first value to a second value by means of the controller;
  changing the operating device from the second position to a third position;
  changing the stepping motor from a first position to a second position corresponding the third position of the operating device; and
  changing the shift fork from a first position to a second position in order to change from a first gear to a second gear.

Furthermore, the present invention provides a power tool for carrying out the method according to the invention, whereby the power tool has a transmission, an electric motor for generating and transmitting a torque to the transmission, a controller for setting the rotational speed of the electric motor, an operating device for selecting a gear in the transmission, a shift fork for engaging a gear in the transmission and a stepping motor for transmitting a movement of the operating device to the shift fork for engaging a gear in the transmission, whereby the operating device has at least one signal transmitter as well as at least one sensor for receiving at least one signal from the at least one signal transmitter.

According to another advantageous embodiment of the present invention, it is possible for the signal transmitter to be configured in the form of a magnet and for the sensor to be configured in the form of a Hall sensor. However, it is likewise possible to use any other suitable type of signal transmitter and sensor.

According to an advantageous embodiment of the present invention, it is also possible for the transmission to contain a shifting energy storage means, as a result of which a force can be applied onto the shift fork in order to pretension the shift fork to make a transition from a first position to a second position. In this context, the shifting energy storage means can be configured as a spring element. Consequently, a new gear can be preselected during a gear selection procedure so that the new gear is engaged as soon as the transmission is able to do so. This is particularly advantageous if the constellation of the gear wheels with respect to each other inside the transmission does not immediately allow a new gear to be engaged.

Moreover, the present invention also provides a transmission for a power tool, especially a core drilling machine, for carrying out the method according to the invention.

Additional advantages can be gleaned from the figure description below. The figures show several embodiments of the present invention. The figures, the description and the claims contain numerous features in combination. The person skilled in the art will advantageously also consider the features individually and merge them to form additional meaningful combinations.

BRIEF DESCRIPTION OF THE DRAWINGS

Identical and similar components are designated by the same reference numerals in the figures.

The following is shown.

DETAILED DESCRIPTION

Figure 1:
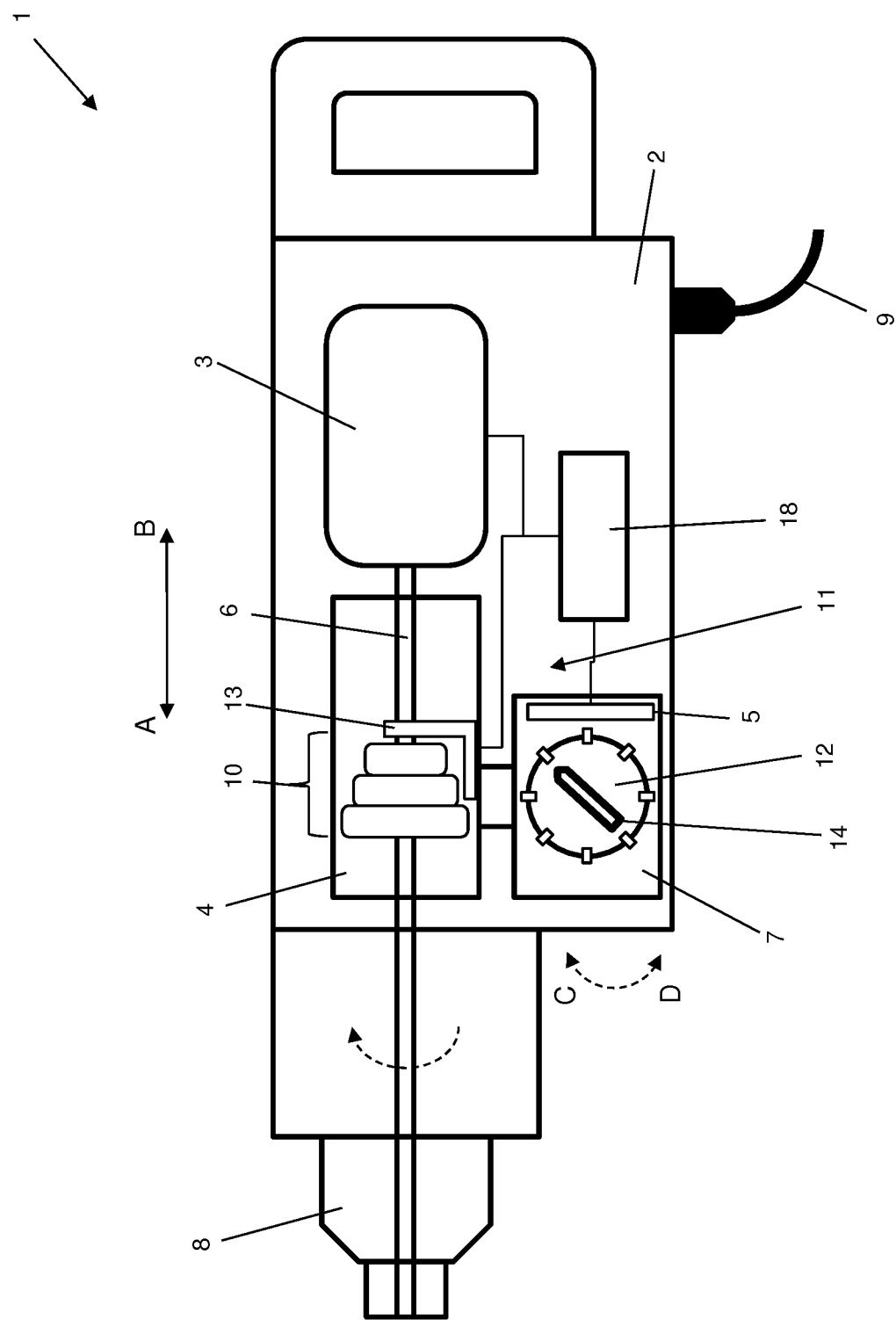
FIG. 1: a schematic view of a power tool according to the invention with a transmission according to the invention, an electric motor, a controller and an operating device.

FIG. 1 shows an embodiment of a power tool 1 according to the invention, configured as a core drilling machine.

The power tool 1 configured as a core drilling machine essentially comprises a housing 2, an electric motor 3, a transmission 4, a controller 18, a driven shaft 6, an operating device 7 and a tool bit socket 8. As can be seen in FIG. 1, the electric motor 3, the transmission 4, the controller 18 and the driven shaft 6 are situated inside the housing 2. The operating device 7 is situated on the housing 2, so that it can be operated from the outside by a user. A power cable 9 that supplies the power tool 1 with electric power is indicated on the housing 2.

The electric motor 3 serves to generate a torque that is transmitted to the tool bit socket 8 via the driven shaft 6 and the transmission 4. The tool bit socket 8 serves to receive and hold a tool bit with which a material (e.g. concrete) can be worked. The tool bit in the case of the embodiment of the power tool 1 in the form of a core drilling machine can be a core bit. Neither the tool bit nor the material is shown in the figures.

The controller 18 serves, among other things, to set and monitor the rotational speed of the electric motor 3. For this purpose, the controller 18 is connected to the operating device 7, to the transmission 4 and to the electric motor 3; see FIG. 1.

The transmission 4 contains three gear wheels so that transmission ratio of the torque introduced by the electric motor 3 into the transmission 4 can be varied. Even though the transmission 4 shown in the figures only has three gear wheels 10, it is possible to select more than three gears in the transmission 4, as will be shown in detail below. However, it is also possible for the transmission 4 to have more than or fewer than three gear wheels 10.

An embodiment of the transmission 4 according to the invention is shown in FIGS. 3 to 6. The transmission 4 is connected to the operating device 7 and it essentially comprises a housing 11, part of the driven shaft 6, a stepping motor 12, the three gear wheels 10 as well as a shift fork 13. The stepping motor 12 and part of the shift fork 13 are located in the housing. The stepping motor 12 can be configured as a shifting cylinder or as a Geneva drive.

The operating device 7, in turn, serves to allow the user of the power tool 1 to select a gear in the transmission 4 or to set a rotational speed value for the electric motor 3. Setting the rotational speed value by means of the operating device 7 by using the present method according to the invention does not bring about a mechanical gear change but rather an electronic one. In other words, setting or changing the rotational speed value by means of the operating device 7 appears as a mechanical gear change in which a change is made from one gear wheel constellation to another gear wheel constellation.

The operating device 7 also comprises a rotary switch 14 that can be rotated relative to a numerical display in the C or D rotational direction. On the basis of the numerical display, the user of the core drilling machine 1 can see which gear has been or can be engaged. The rotary switch 14 can also be referred to as a gear selection switch.

According to an alternative not shown in the figures, the operating device 7 can also be connected to an electronic display so that the gear that is currently engaged can be shown to the user on a screen (display).

The stepping motor 12 serves essentially to convert the rotational movement of the rotary switch 14 in the C or D rotational direction into a linear movement of the shift fork 13 in the A or B direction. For this reason, the stepping motor 12 is connected to the shift fork 13. A special feature of the stepping motor 12 is the fact that not every rotational movement of the rotary switch 14 results in a corresponding rotational movement of the stepping motor 12. In other words, only every other rotational movement carried out over certain sections or else only every other rotational movement along a sector causes a rotational movement of the stepping motor 12. The shift fork 13, in turn, serves to actually align the gear wheels 10 relative to each other inside the transmission 4 in order to set a given transmission ratio or gear wheel constellation.

Moreover, the operating device 7 comprises a signal transmitter 15 in the form of a magnet. As an alternative, the operating device 7 can also comprise more than one signal transmitter 15 in the form of several magnets. However, it is also possible for any other suitable type of signal transmitter 15 to be used. Thus, for instance, according to an alternative embodiment, a metal ring can also be provided as the signal transmitter 15 and so can an appropriate induction sensor that matches the metal ring.

The signal transmitter 15 is permanently positioned on the rotary switch 14 and it serves to emit signals corresponding to the location or rotational position of the rotary switch 14 of the operating device 7.

Furthermore, the operating device 7 has several sensors 16 in the form of Hall sensors corresponding to the configuration of the signal transmitter 15 as a magnet. However, it is also possible to employ any other suitable type of sensor. The sensor 16 serves to receive the signal from the signal transmitter 15. The arrows shown on the signal transmitter in FIG. 2 depict magnetic fields.

Figure 2:
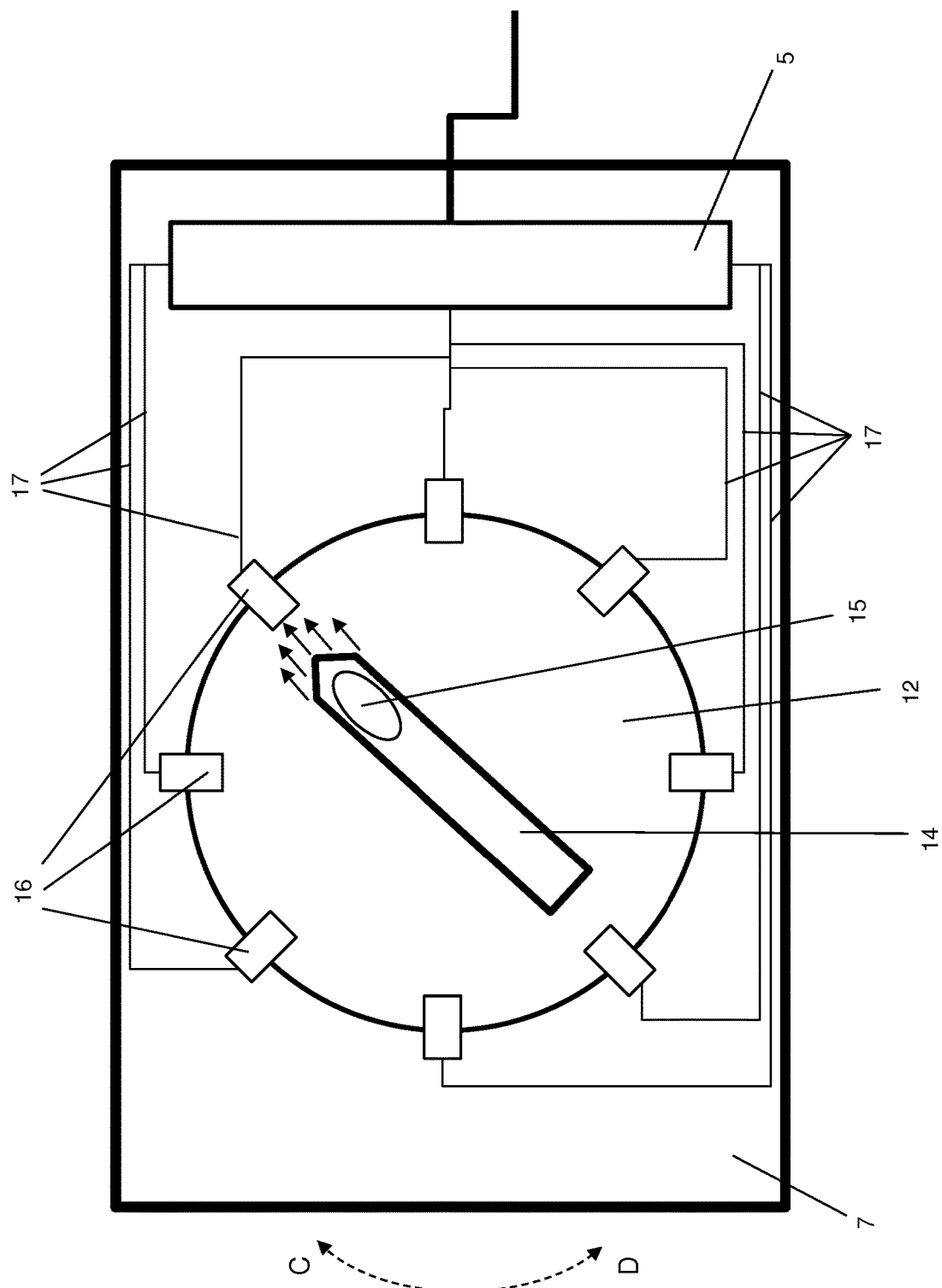
FIG. 2: a detailed view of a rotary switch of the operating device, with a signal transmitter and a sensor.
Figure 3:
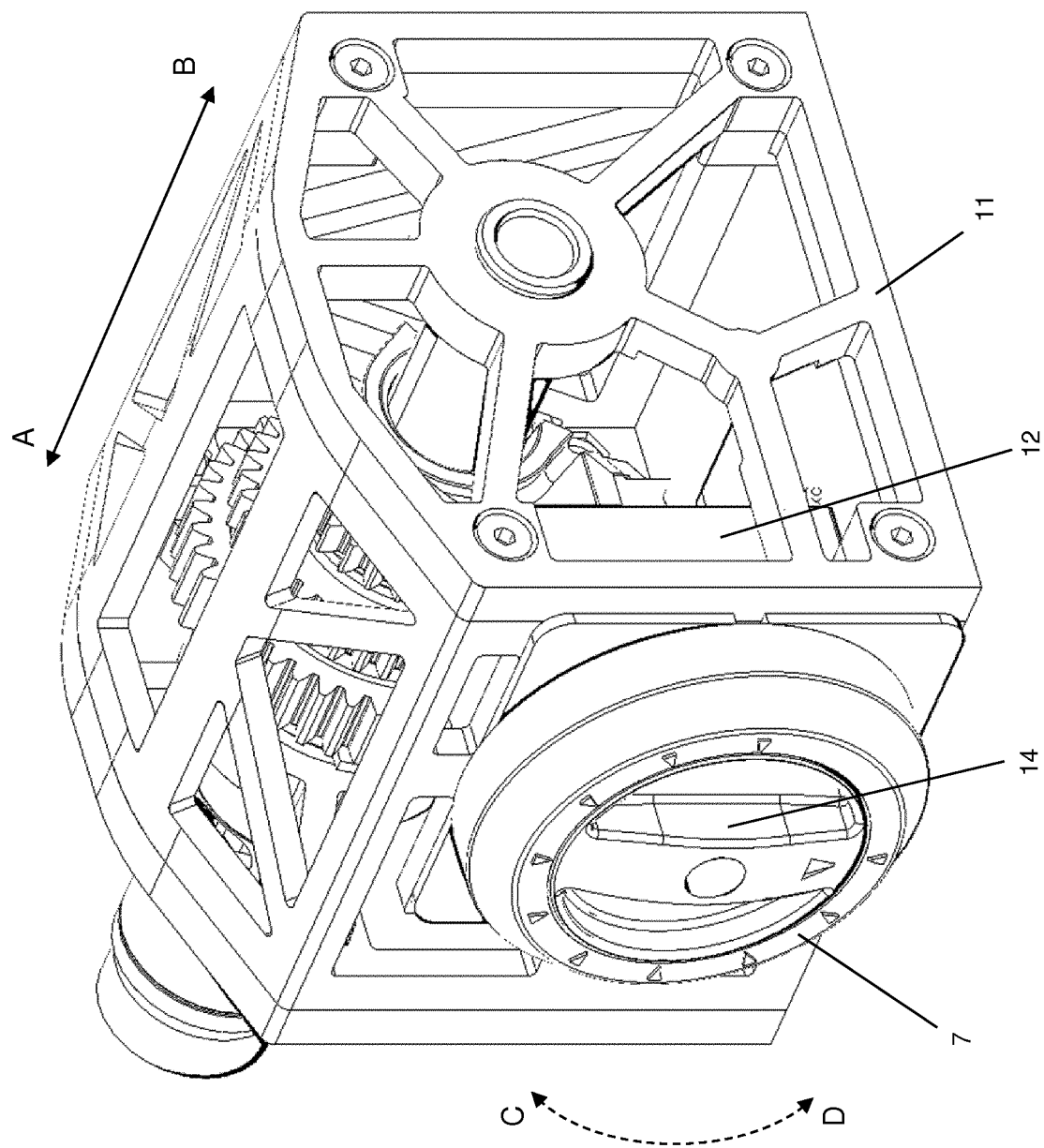
FIG. 3: a perspective view of a transmission according to the invention for the power tool.
Figure 4:
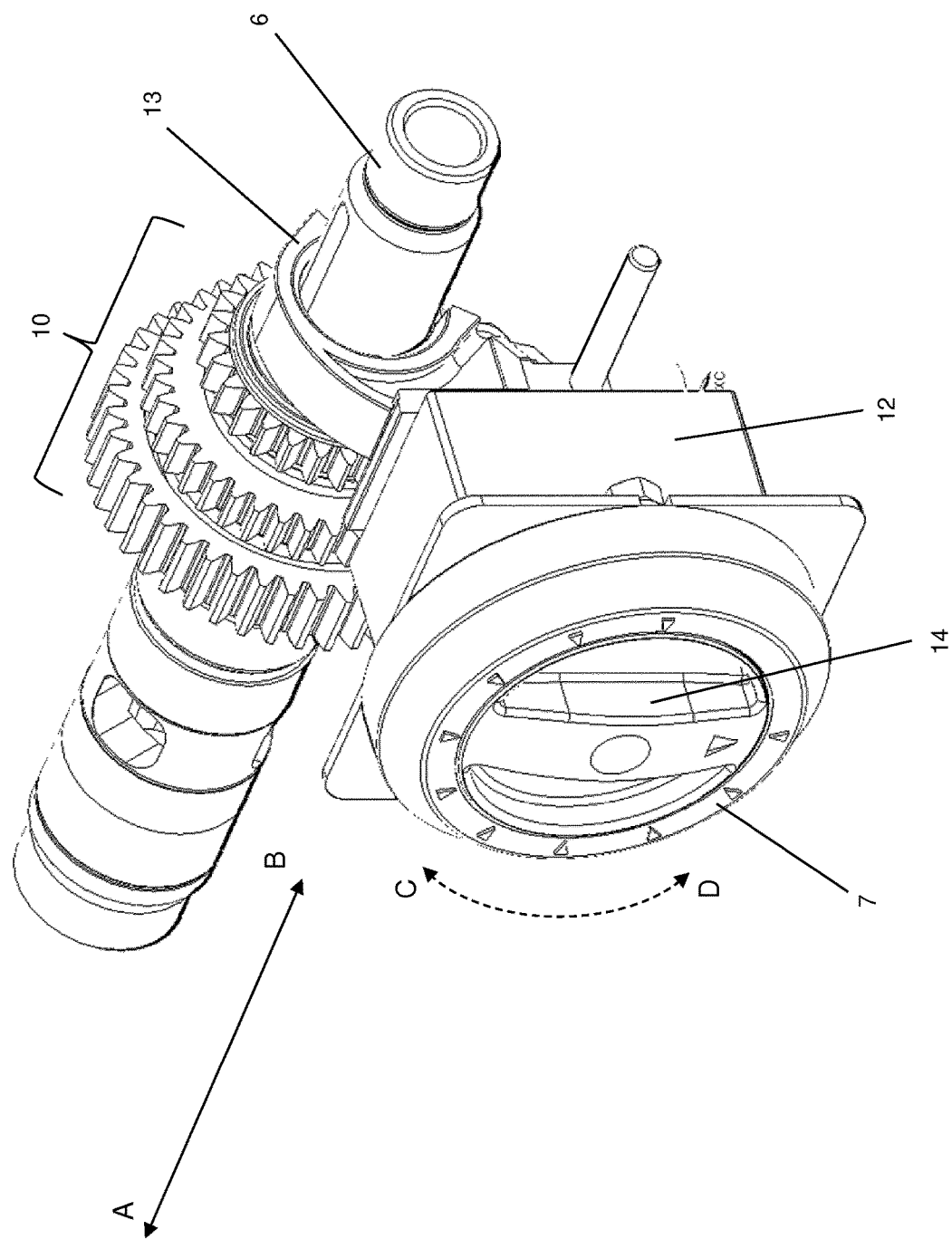
FIG. 4: a perspective view of the operating device, a shift fork and the gear wheels.
Figure 5:
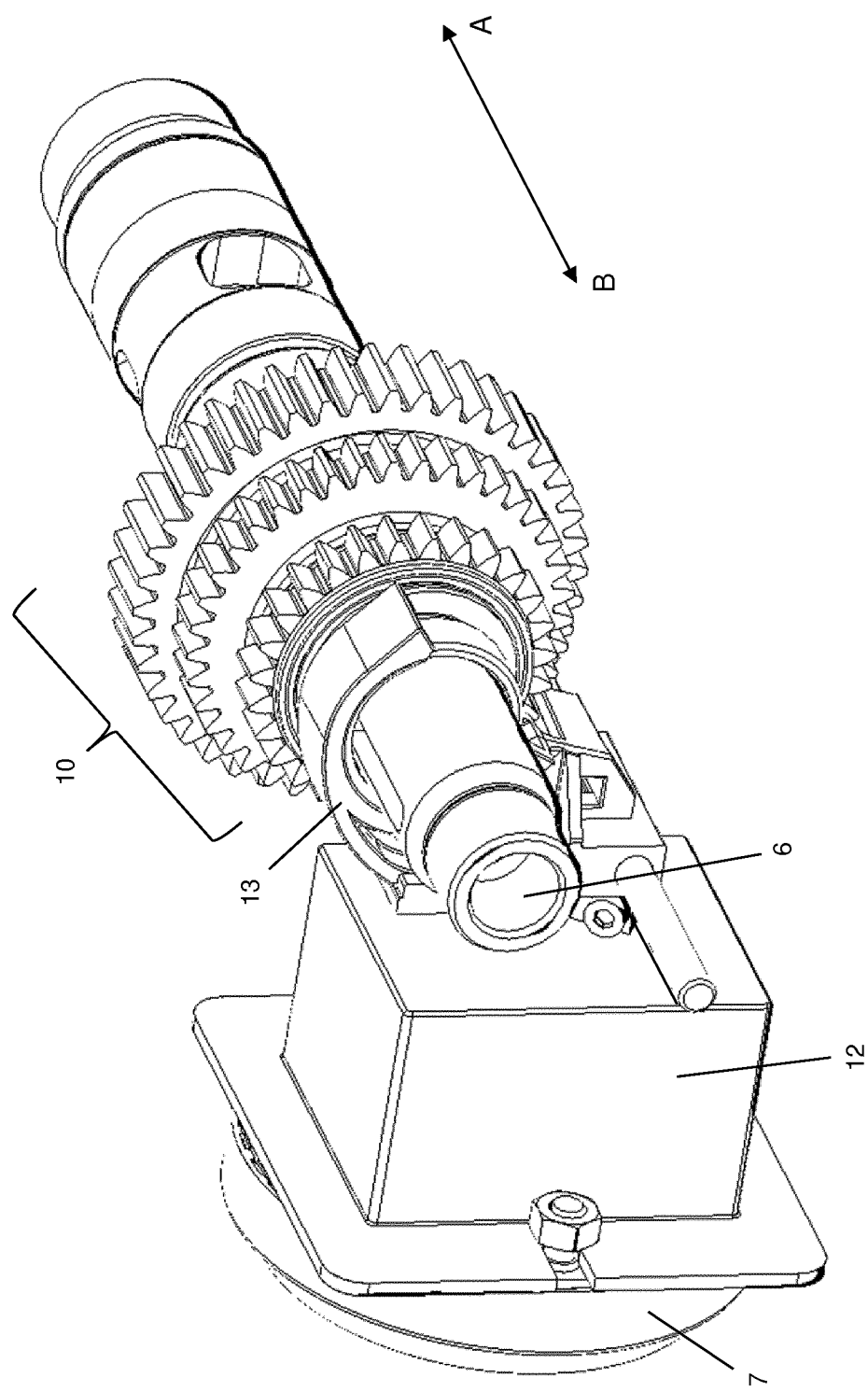
FIG. 5: another perspective view of the operating device, the shift fork and the gear wheels.
Figure 6:
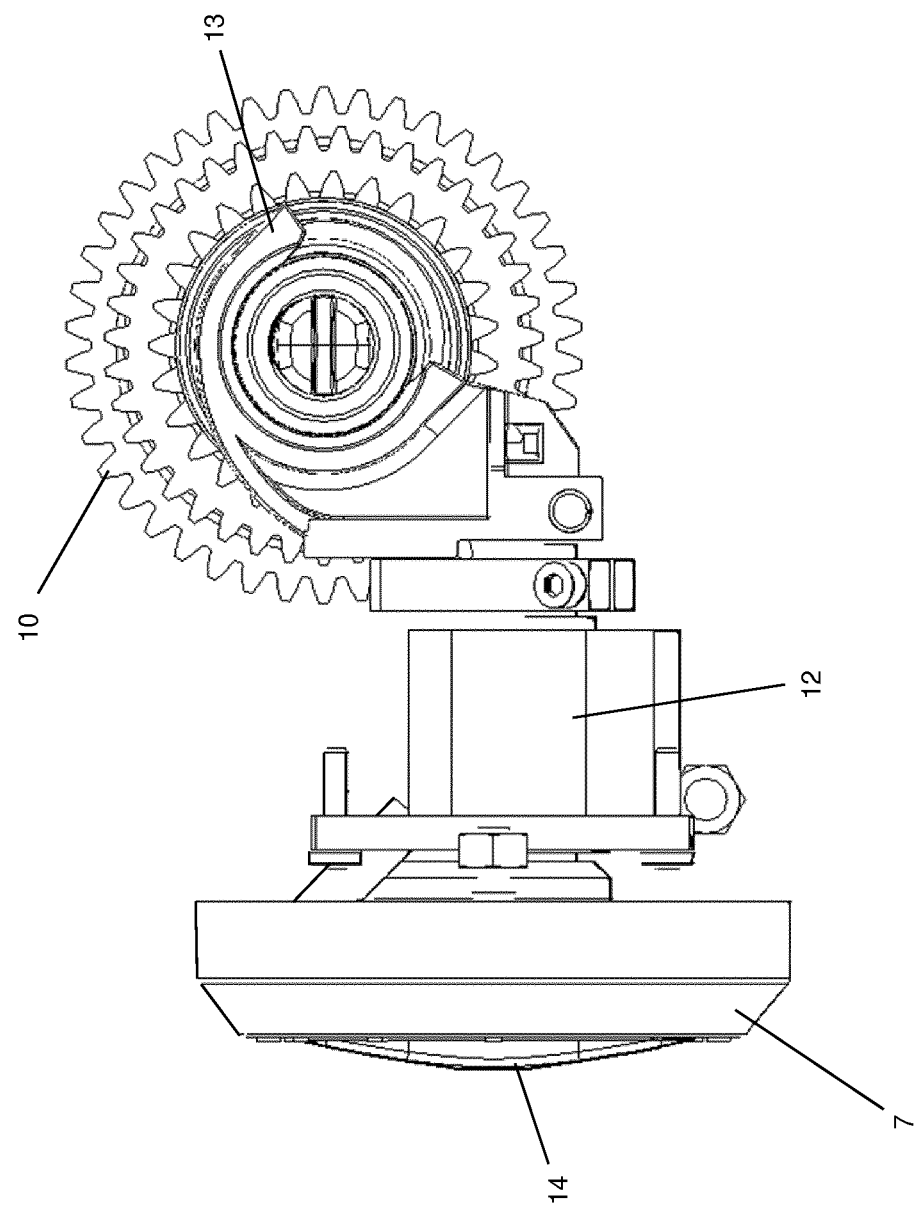
FIG. 6: a front view of the operating device, the shift fork and the gear wheels.
Figure 7:
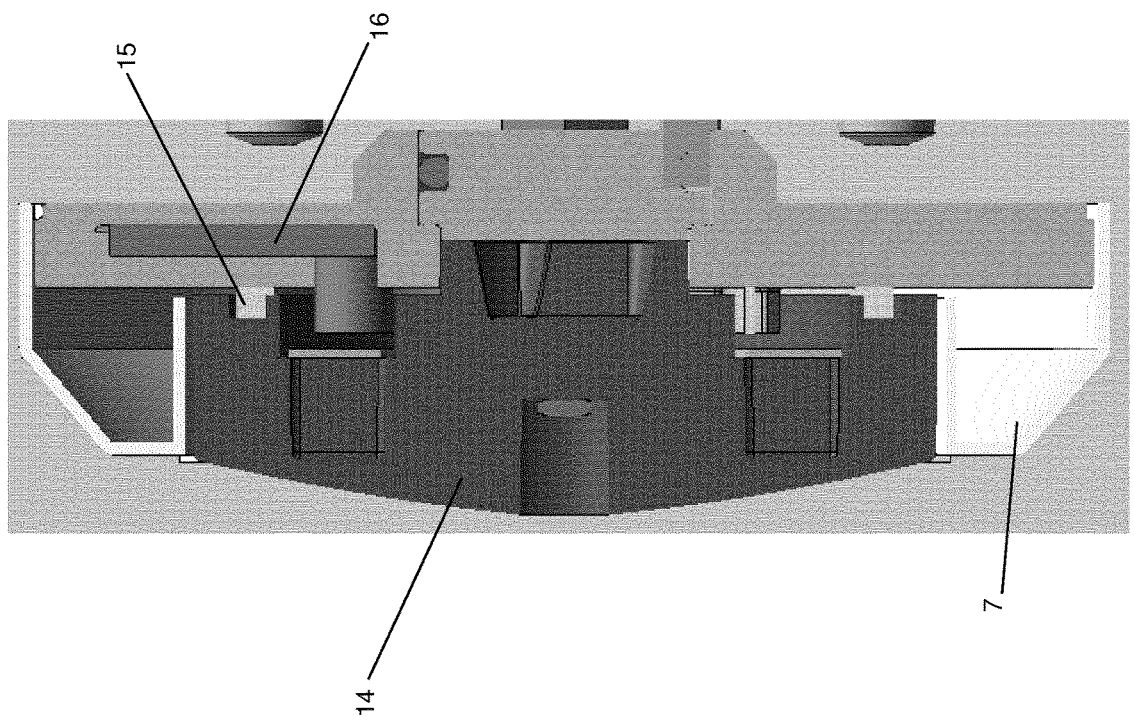
FIG. 7: a sectional view through the operating device.

As shown in FIG. 2, four sensors 16 are permanently positioned in a circle on the operating device 7 so as to detect the magnetic field of the signal transmitter 15 configured as a magnet on the rotary switch 14. It should be noted that a sensor 16 is only provided on every other possible rotational position of the rotary switch 14 (see FIGS. 8 and 9). If the rotary switch 14 is oriented towards one of these four rotational positions fitted with a sensor 16, the sensor 16 can detect the signal transmitter 15 on the rotary switch 14 and can associate the position of the rotary switch 14 with one of the four rotational positions. However, it is also possible for sensors 16 to be positioned at more than or fewer than four rotational positions.

Figure 8:
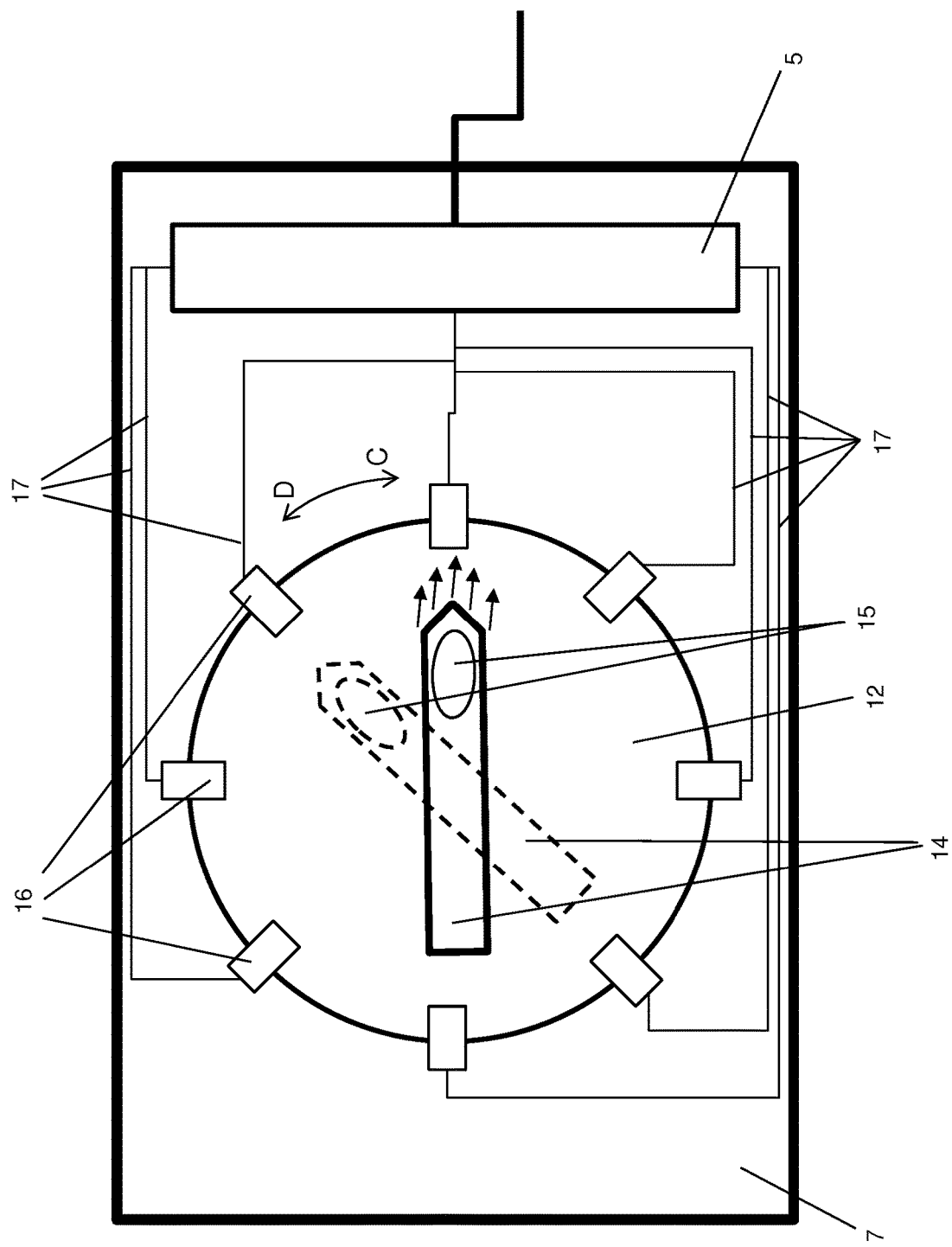
FIG. 8: the rotary switch of the operating device that is being moved from a first position to a second position.
Figure 9:
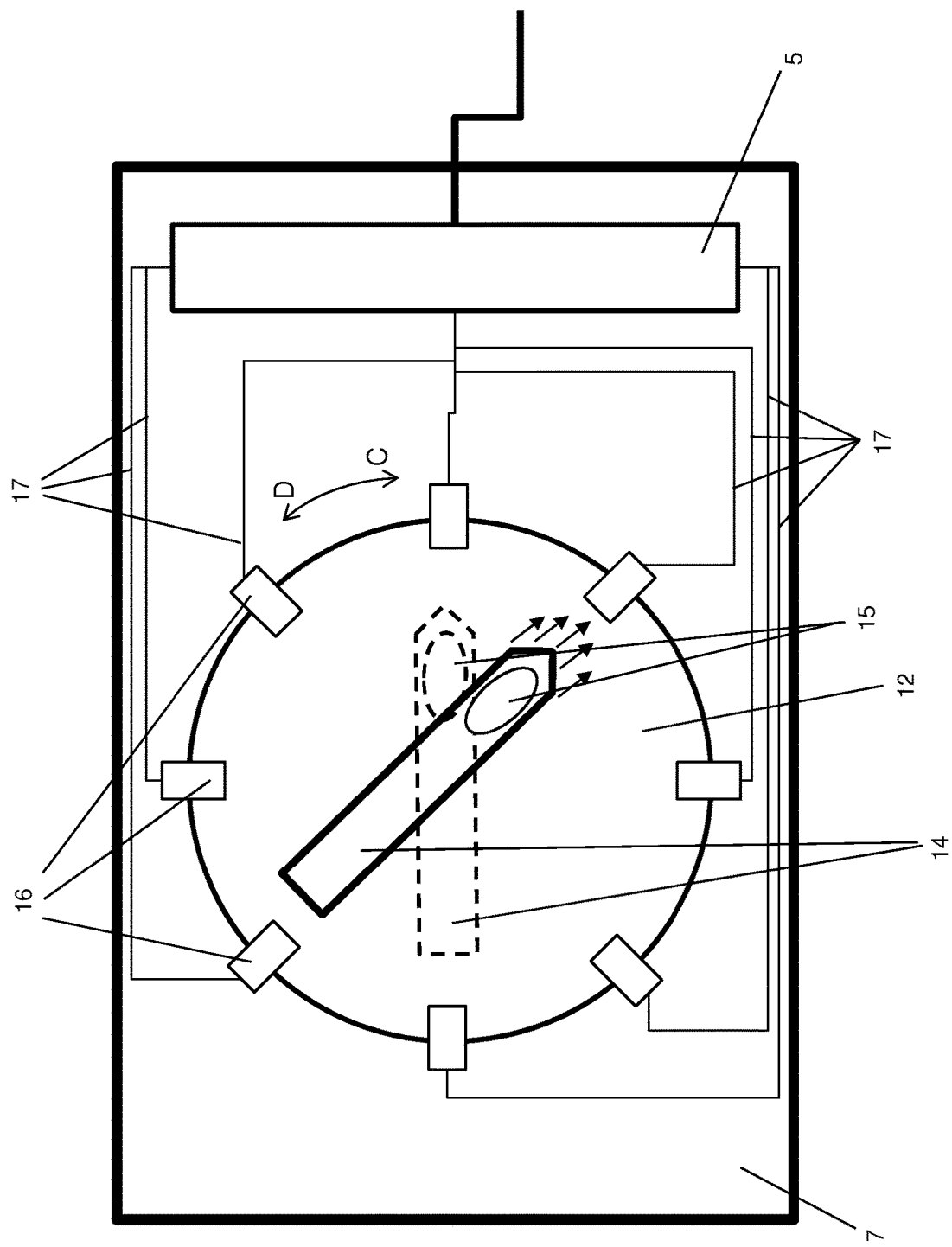
FIG. 9: the rotary switch of the operating device that is being moved from a second position to a third position.

Each sensor 16 is connected to a control unit 5 via a line 17 in order to transmit the signals received from the signal transmitter 15 to the control unit 5 (see FIGS. 2, 8 and 9). The control unit 5, in turn, is connected to a controller 18 of the electric motor 3 (see FIG. 1). As an alternative, the control unit 5 is also connected directly to the electric motor 3. The connection serves to transmit an appropriate signal from the control unit 5 of the transmission 4 to the controller 18 of the electric motor 3. The controller 18 can regulate the power supply to the electric motor 3 and can thus control the rotational speed value of the electric motor 3. The rotational speed value is the target rotational speed value.

Since (as already elaborated upon above) the stepping motor 12 can convert a continuous rotational movement of the rotary switch 14 into an intermittent rotational movement, not every rotational movement of the rotary switch 14 causes an activation of the shift fork 13 and thus a mechanical gear change or a change in the gear wheel constellation.

If, as shown in FIG. 8, the rotary switch 14 is rotated in the C direction from a first position to a second position in order to move the operating device 7 from a first position to a second position for purposes of selecting a gear in the transmission 4, the stepping motor 12 moves the shift fork 13 in the A direction so that the gear wheels 10 in the transmission 4 are moved to a different constellation. In other words, a higher gear is engaged by means of the stepping motor 12 and the shift fork 13. In this process, no signal to change the rotational speed of the electric motor 3 is transmitted from the sensor 16 to the controller 18 via the control unit 5. Here, the gear change takes place purely mechanically.

If, however, as shown in FIG. 9, the rotary switch 14 is rotated further in the C direction from the second position to a third position in order to change the operating device 7 from the second position to a third position for purposes of selecting a different gear in the transmission 4, a signal from the signal transmitter 15 (that is to say, from the magnet) to the appropriate sensor 16 is detected. The sensor 16 sends a signal to the control unit 5. The control unit 5 detects the rotational position of the rotary switch 14 and, in turn, sends an appropriate signal to the electric motor 3 via the controller 18 in order to set a target value for the rotational speed. In the present case, the target value for the rotational speed is raised. In this process, the shift fork 13 is not activated by the stepping motor 12, and thus the gear is changed purely electronically. Therefore, due to the change in the target value for the rotational speed of the electric motor 3, an additional spread can be attained for the transmission 4 without a mechanical gear change, that is to say, without a new gear wheel constellation.

According to an alternative embodiment, the transmission 4 can also contain a shifting energy storage means. The shifting energy storage means here can be configured as a spring mechanism or as a spring. The shifting energy storage means configured as a spring mechanism applies a force onto the shift fork 13 in order to pretension the shift fork 13 to make a transition from a first position to a second position. The shifting energy storage means is not shown in the figures.

If the shift fork 13 cannot make a linear movement, then the shifting energy storage means configured as a spring mechanism is activated and it stores the movement energy in a pretension or spring pretension so that a gear is preselected. In other words, the selected gear can only be actually engaged at the time of a re-start or when the rotational speed is low. As soon as the movement of the shift fork 13 has become possible, the gear preselected by the shifting energy storage means is engaged by means of the shift fork 13 and the shifting energy storage means once again assumes the initial position, that is to say, the non-tensioned position. The mechanism of the gear preselection is configured in such a way that it is possible to shift from the first to the highest selectable gear without bringing about an alignment inside the shifting mechanism.

REFERENCE NUMERALS

1 power tool
2 housing of the power tool
3 electric motor
4 transmission
5 control unit
6 driven shaft
7 operating device
8 tool bit socket
9 power cable
10 gear wheel
11 housing of the transmission
12 stepping motor
13 shift fork
14 rotary switch
15 signal transmitter
16 sensor
17 line
18 controller

What is claimed is:

1. A method for selecting a gear in a transmission of a power tool, the power tool having an electric motor for generating and transmitting a torque to the transmission as well as a controller for setting a rotational speed of the electric motor, the transmission having an operating device for selecting a gear in the transmission, a shift fork for engaging the gear in the transmission as well as a stepping motor for transmitting a movement of the operating device to the shift fork, the operating device having at least one signal transmitter as well as at least one sensor for receiving at least one signal from the at least one signal transmitter, the method comprising the following steps:

changing the operating device from a first position to a second position in order to select a gear in the transmission;

detecting the at least one signal via at least one sensor and corresponding to the second position of the operating device;

sending the at least one signal to the controller;

changing the rotational speed of the electric motor from a first value to a second value via the controller;

changing the operating device from the second position to a third position;

changing the stepping motor from a stepping motor first position to a stepping motor second position corresponding to the third position of the operating device; and changing the shift fork from a shift fork first position to a shift fork second position in order to change from a first gear to a second gear.

2. A power tool for carrying out the method according to claim 1, comprising the transmission, the electric motor for generating and transmitting the torque to the transmission, the controller for setting the rotational speed of the electric motor, the transmission having the operating device for selecting the gear in the transmission, the shift fork for engaging the gear in the transmission and the stepping motor for transmitting a movement of the operating device to the shift fork for engaging the gear in the transmission, the operating device having the at least one signal transmitter as well as the at least one sensor for receiving the at least one signal from the at least one signal transmitter.

3. The power tool as recited in claim 2 wherein the signal transmitter is configured in the form of a magnet and the sensor is configured in the form of a Hall sensor.

4. The power tool as recited in claim 2 wherein in the transmission contains a shifting energy storage, as a result of which a force can be applied onto the shift fork in order to pretension the shift fork to make a transition from the shift fork first position to the shift fork second position.

5. A transmission for a power tool for carrying out the method according to claim 1, the transmission comprising: the operating device for selecting the gear in the transmission, the shift fork for engaging the gear in the transmission as well as the stepping motor for transmitting a movement of the operating device to the shift fork, the operating device having the at least one signal transmitter as well as the at least one sensor for receiving at least one signal from the at least one signal transmitter.

6. A core drilling machine comprising the transmission as recited in claim 5.

7. A core drilling machine comprising the power tool as recited in claim 2.

8. The method as recited in claim 6 wherein the power tool is a core drilling machine.

* * * * *